(12) United States Patent  
Mizuno et al.

(10) Patent No.: US 9,409,497 B1  
(45) Date of Patent: Aug. 9, 2016

(54) ANTI-UNLOCK TOWEL BAR

(71) Applicant: AISIN TECHNICAL CENTER OF AMERICA, INC., Northville, MI (US)

(72) Inventors: Ryosuke Mizuno, Novi, MI (US); Michael Mixon, Plymouth, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 14/720,421

(22) Filed: May 22, 2015

(51) Int. Cl.
*F16M 13/00* (2006.01)
*B60N 2/08* (2006.01)
*B60N 2/06* (2006.01)

(52) U.S. Cl.
CPC ............. *B60N 2/0881* (2013.01); *B60N 2/06* (2013.01)

(58) Field of Classification Search
CPC ...... B60N 2/0725; B60N 2/08; B60N 2/0862; B60N 2/0881; B60N 2/06
See application file for complete search history.

(56) References Cited

U.S. PATENT DOCUMENTS

| | | | | |
|---|---|---|---|---|
| 3,582,033 A | * | 6/1971 | LaFleche | B60N 2/0825 248/420 |
| 3,866,876 A | * | 2/1975 | Adams | B60N 2/0705 248/292.12 |
| 4,229,041 A | * | 10/1980 | Werner | B60R 22/26 248/393 |
| 4,455,009 A | * | 6/1984 | Foster | B60N 2/0705 248/429 |
| 4,629,151 A | * | 12/1986 | Nishino | B60N 2/1839 248/396 |
| 4,779,832 A | * | 10/1988 | Rees | B60N 2/1615 248/421 |
| 5,799,920 A | | 9/1998 | Wittkowsky et al. | |
| 6,328,272 B1 | | 12/2001 | Hayakawa et al. | |
| 6,609,745 B2 | | 8/2003 | Miyahara et al. | |

* cited by examiner

*Primary Examiner* — Amy Sterling
(74) *Attorney, Agent, or Firm* — Oblon, McClelland, Maier & Neustadt, L.L.P.

(57) ABSTRACT

A seat apparatus including an operating handle; a slot hole bracket including at least one inclined slot, the at least one profiled slot guides the operating handle in a horizontal direction and a vertical direction based on an inclined force on the operating handle; and one or more lock brackets movably attached to the operating handle and the slot hole bracket.

9 Claims, 14 Drawing Sheets

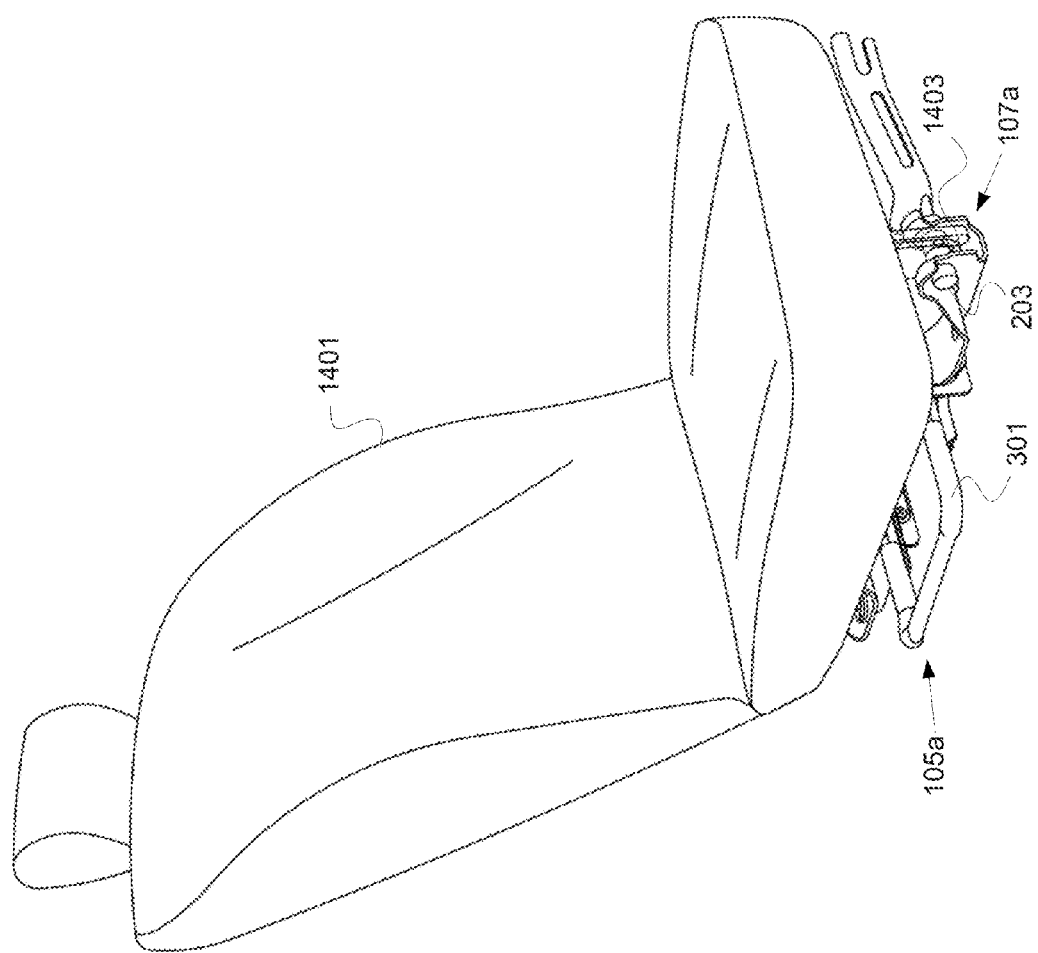

ANTI-UNLOCK TOWEL BAR

BACKGROUND

1. Field of the Disclosure

This application relates generally to improvements to a seat arrangement structure. More particularly the present disclosure relates to improvements relating to a towel bar or operating handle assembly, used for adjusting a seat in lateral or longitudinal direction, to keep the seat arrangement in a locked position during an event of an impact force.

2. Description of the Related Art

Vehicle seats are designed to offer comfort, and space to an occupant by allowing seat adjustments to a desired position. The adjustable vehicle seat allows an occupant to obtain a more comfortable seating position and to provide space behind, in front or on side of the vehicle seat to assist in entering and exiting the vehicle or storing objects.

Vehicle seats are typically mounted on a seat arrangement device. The seat arrangement device allows for relative movement of the seat with respect to the vehicle and other seats respectively. For instance the seat arrangement device provides for a seat to be moved away or moved toward other seats, moved in lateral (sideways) or longitudinal (forward and backward) direction of the vehicle.

The seat arrangement device assembly and seat mounting is often a complex process since it involves various components assembled in a particular order to enable seat movement in desired direction. One of the components of seat arrangement device includes a track arrangement fitted with a seat sliding device to achieve the desired lateral and longitudinal movement of the seats. The lateral movement involves moving a seat towards a side of a vehicle or moving the seat towards the other seat followed by locking the seat in a desired position. Further, to lock the seat in a desired position a locking or latch mechanism is provided.

A linear adjustable vehicle seat allows an occupant to obtain a more comfortable seating position and to provide additional space around the vehicle seat for ease of entering and exiting or storing objects. Further, latch mechanisms are generally known for locking the vehicle seat position at a plurality of locations. Seat latch mechanisms are generally known as pawl and positive engagement latch-type devices and mechanisms.

A part of the seat sliding device that assists in locking and unlocking the seat in a desired position is called a towel bar or operating handle assembly. Typically the towel bars employ a lever and rotation mechanism whose function is to place the locking mechanism in a locked or unlocked position. The towel bar operates when a vertical force is applied to the lever that leads to the rotation of a bar connected to the locking mechanism, thus placing the locking mechanism in the locked or unlocked position. The force may be applied by an operator or may be generated during a vehicle crash.

In an event of a vehicle impact, increased of G-forces (g) are generated due to sudden acceleration and deceleration of the vehicle. G-force (g) is a measure of acceleration or deceleration and is not a force. These G-forces can also cause the towel bar or the operating bar assembly to unlock the seat.

The problem of unintentional unlocking of an upper rail, on which a seat is installed, from the lower rail is addressed in U.S. Pat. No. 5,799,920. The patent discloses a two piece release lever formed of an operating handle and an actuating lever which swivel about a pivot point to lock and unlock the seat. The operating handle is supported by a connecting head having profiled slots and a tension spring. The release lever is configured such that during an unintentional operation, the operating handle is pushed backwards in the profiled slots of the connecting head against the spring tension and is blocked at the rear end of the profiled slot thus preventing the release lever to unlock the seat. When the unintentional actuation is removed the spring pushes the operating handle towards the front end of the profiled slot. In case of an intentional actuation the operating handle remains at the front end of the profiled slot and the release lever can be operated by vertically upward and downward forces.

SUMMARY

An operating handle apparatus, including an operating handle including one or more connecting bars; one or more connecting links with a first end having a plurality of holes and a second end that corresponds to said one or more connecting bars of the operating handle; one or more lock brackets with a third end having a plurality of holes and a fourth end including a lock slot that connects to a locking mechanism; a slot hole bracket including at least one profiled slot and at least one inclined slot; and one or more rivets that passes through holes of the first end of said one or more connecting links, the at least one profiled slot of the slot hole bracket, the at least one inclined slot of the slot hole bracket, and holes of the third end of said one or more lock brackets.

The forgoing general description of the illustrative implementations and the following detailed description thereof are merely exemplary aspects of the teachings of this disclosure, and are not restrictive.

BRIEF DESCRIPTION OF THE DRAWINGS

FIG. 14 is a perspective view of a seat mounted on the operating handle assembly according to an aspect of present disclosure.

DETAILED DESCRIPTION

Figure 1:
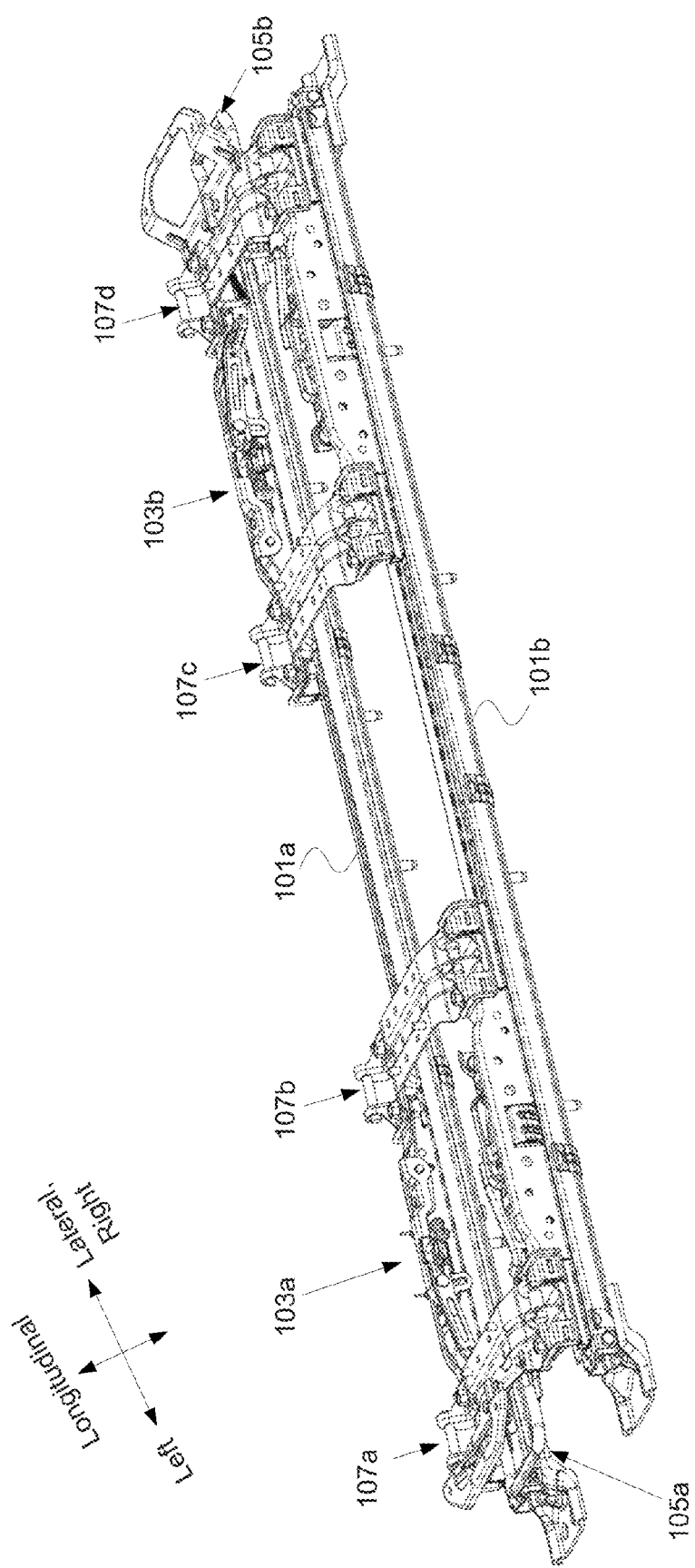
FIG. 1 is a perspective view of a vehicle seat slide apparatus according to an aspect of present disclosure.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10% or preferably 5% in certain embodiments, and any values therebetween.

The terms "longitudinal", "lateral" and similar terms generally refer to the direction of movement with respect to the vehicle's front and side portion. The direction of movement along the front and rear is longitudinal direction, while direction of movement towards and away from the side is lateral direction.

The terms "towel bar", "operating handle" or "U-handle" are used interchangeable and refer to the same component.

FIG. 1 is a perspective view of a vehicle seat slide apparatus according to an embodiment of present disclosure and includes various components assembled together to enable the seat movement in desired position. The seat sliding apparatus includes two identical tracks 101a and 101b, a seat mounting assembly 103a (or 103b) and an operating handle assembly 105a (or 105b). The tracks 101a and 101b are disposed in pairs along the lateral direction in the center of the vehicle and are fixed to the floor of the vehicle. The tracks have a groove extending along the length of the track that guides a sliding mechanism in lateral direction. Holes are provided along the sides of the track that engages with a locking mechanism.

The seat mounting assembly 103a (or 103b) includes seat mounting brackets 107a and 107b (or 107c and 107d) and other attachments and fixtures to install a seat. The seat mounting assembly 103a (or 103b) is movably attached to the track arrangement 101a and 101b via a sliding mechanism. The sliding mechanism includes an operator handle assembly 105a (or 105b) to move the seat mounting assembly 103a (or 103b) in a desired position and a locking mechanism to lock the sliding mechanism in the desired position. The operating handle assembly 105a (or 105b) is the focus of the present disclosure and is discussed in detail hereafter.

Figure 2:
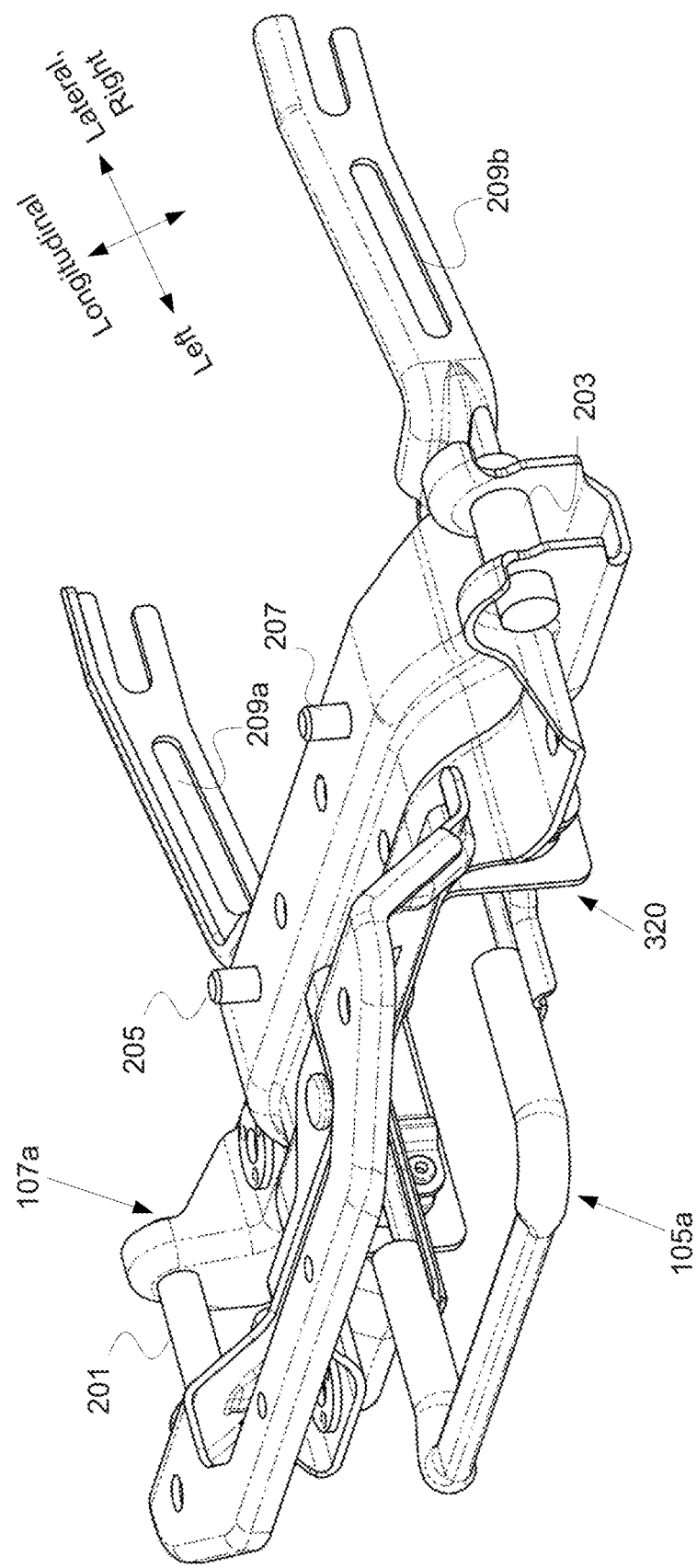
FIG. 2 is a perspective view of an operating handle assembly with a seat mounting bracket of FIG. 1 according to an aspect of present disclosure.

FIG. 2 provides a perspective view of the operating handle assembly 105a with a seat mounting bracket. The seat mounting bracket 107a is connected on top of a slot hole bracket 320, which is a component of the operating handle assembly 105a. The seat mounting bracket 107a includes strikers 201 and 203 used to hook on the seat. The seat mounting bracket 107a is disposed in a longitudinal direction and fixed such that a relative movement with respect to the slot hole bracket 320 is restricted. The relative movement is restricted via pins 205 and 207. The pins 205 and 207 may also be used as a guiding mechanism to install the seat mounting bracket 107a on the operating handle assembly 105a. Alternately, the seat mounting bracket 107a can be attached to the slot hole bracket 320 using fasteners or welding while preventing relative movement between the two. The arrangement described above is exemplary and alternate embodiment may include a slot hole bracket 320 modified to allow relative movement between the slot hole bracket 320 and the seat mounting bracket 107a. Additional seat mounting elements may be installed on the operating handle assembly 105a in the slots 209a and 209b.

Figure 3:
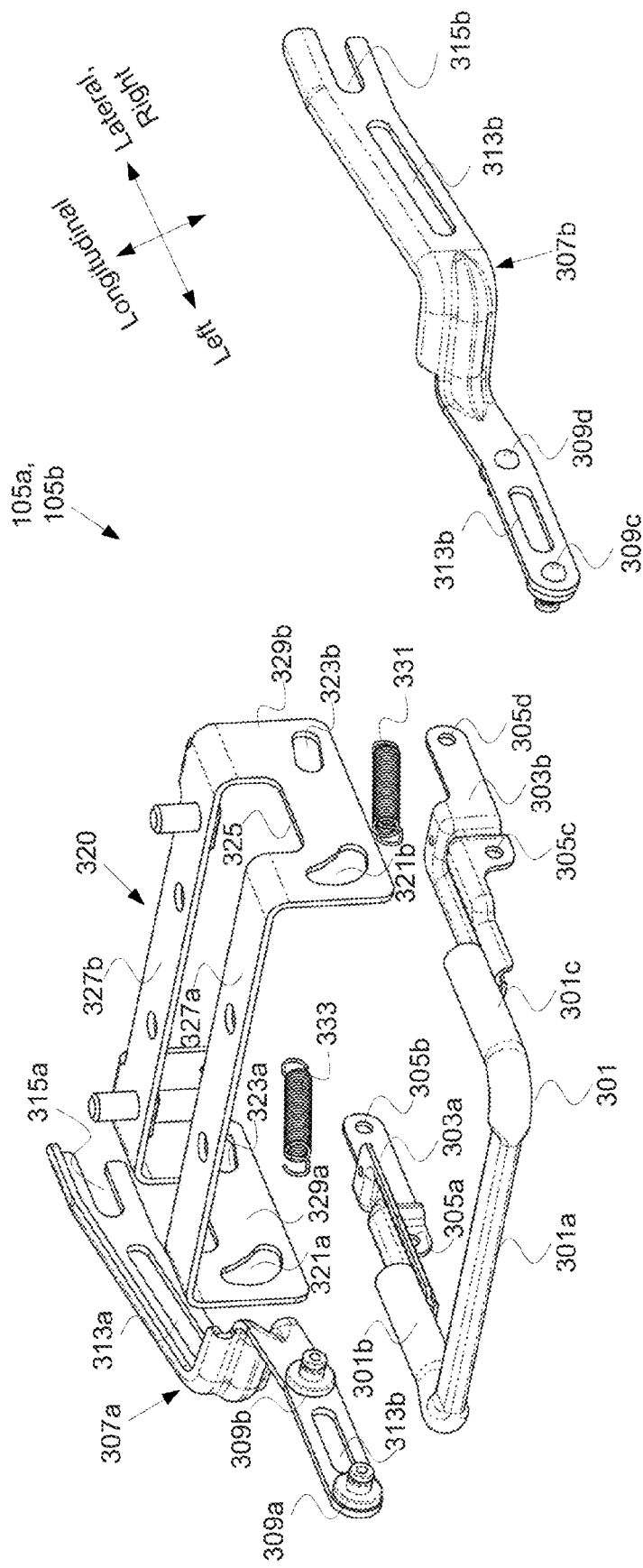
FIG. 3 is an exploded view of the operating handle assembly according to an aspect of present disclosure.

FIG. 3 illustrates an exploded view of the operating handle assembly 105a. The components includes an U-handle 301, connecting links 303a and 303b, lock brackets 307a and 307b, a slot hole bracket 320, and springs 331 and 333.

The U-handle 301 is a U-shaped lever that can be divided into three parts namely force bar 301a, and connecting bars 301b and 301c. A force is applied to the force bar 301a to operate anti-unlock towel bar. The connecting bars 301b and 301c are connected to the ends of the force bar 301a respectively. A part of the open end of the connecting bars 301b and 301c are attached to the connecting links 303a and 303b respectively. The open end of the connecting bars 301b and 301c have a circular cross-section, while one end of the connecting links 303a and 303b have a slot that conforms to the outer surface of the open ends of the connecting bars 303a of the U-handle 301. The connecting bars 303a and 303b can be joined by welding, fasteners, or other joining methods.

According to an embodiment of the present disclosure, the U-handle 301 has a hollow circular cross-section. Alternately, the handle can be formed of different shapes and cross-section. For example the operating handle 301 can be a L-shaped, oval-shaped, M-shaped, V-shaped, triangle-shaped, etc. The cross section can be a hollow rectangular, a solid circular, a solid rectangular, a hollow triangular, a solid triangular, etc. Furthermore, the open ends of the U-handle can be modified to produce a composite cross-section. For instance, a U-handle of hollow circular cross-section can be partially flattened at the ends by applying pressure to produce a rectangular cross-section, or the ends of the U-handle may be attached to a rod of different cross-section.

The U-handle 301 can be manufactured from a rod of selected cross-section by performing a bending operation at the desired location to produce a desired shaped. For example, a hollow rod can be bent at right angle in two locations to form a U-shaped handle. Alternately, it can be manufactured by joining two straight rods perpendicularly to the ends of a third rod. The joining can be done using one of the various joining methods such as welding, fasteners etc.

The connecting links 303a and 303b have two ends that are referred as a conforming-end and a hole-end in the embodiment of the present disclosure. The conforming-end conforms to the cross-section of the end of U-handle 301b and 301c. The conforming-end can have any cross-section such as semi-circular, rectangular, composite of circular and rectangular etc. while being compatible with the ends of the U-handle 301b and 301c in order to create a joint. The hole-end has one or more holes on the side of the connecting link such that the axis of hole(s) is in the longitudinal direction. The holes serve as connection point between the connecting link 303b (or 303a) and the locking bracket 307b (or 307a). For example, holes 305c and 305d (305a and 305b) of the link 303b (or 303a) have corresponding holes in the lock bracket 307b (or 307a) and a joint is created by rivets 309c and 309d (309a and 309b).

The connecting links 303a and 303b can be manufactured in many different ways. For instance the conforming-end and hole-end can be manufactured from separate plates and welded together perpendicularly. In addition the connecting links 303a and 303b need not be identical as long as the necessary configuration to create a joint with counterparts is maintained.

The lock bracket 307b (or 307a) has two holes corresponding to rivets 309c and 309d, and three slots 311b, 313b and 315b. It is a S-shaped bracket with composite cross-section. The holes at 309c and 309d (309a and 309b) act as connection points to slot hole bracket 320, and connecting link 303b (or 303a). The slots 311b (or 311a) and 313b (or 313a) provided to support additional attachments and to reduce the weight. The slot 315b (or 315a) provides a connection between the locking mechanism (see FIG. 6) and the lock bracket 307b (or 307a). A connecting member of the lock mechanism slides within the slot 315b (or 315a) to activate a lock position or an unlock position of the locking mechanism (see FIG. 6).

Alternately, the lock bracket's slot 315b (or 315a) can be modified depending on the locking mechanism used in the seat slide apparatus. For instance, instead of a slot, a hole (s) may be provided and the locking mechanism may be connecting using fasteners. Alternately, slot or hole may not be required and the locking mechanism may be connected using a welding joint.

Figure 8:
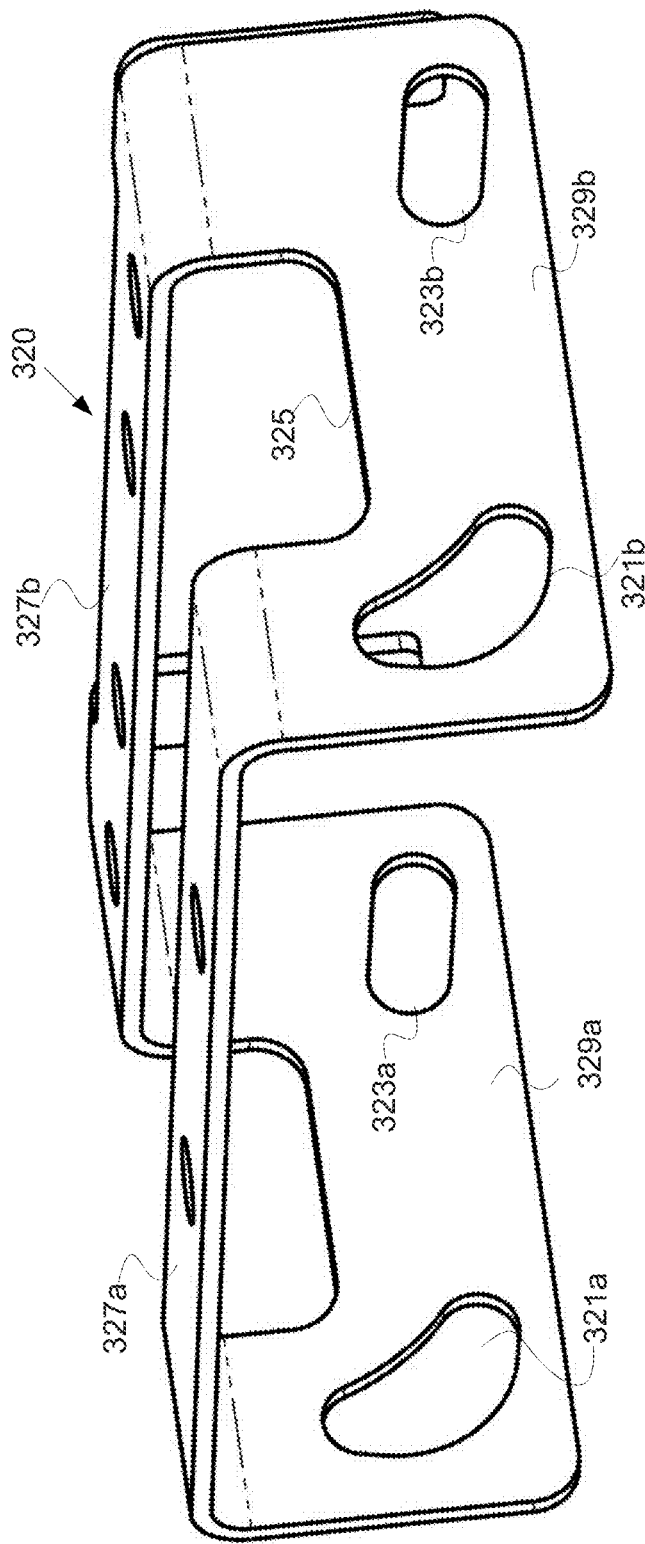
FIG. 8 is a perspective view of the slot bracket of FIG. 3 according to an aspect of present disclosure.

The slot hole bracket 320 restricts transfer of forces that may result in an accidental unlocking of the seat due to high G-forces or other undesired forces. It consists of two profiled slots for instance two bean-shaped slots 321a and 321b, two inclined slots 323a and 323b, a slot 325 and mounting holes on surfaces 327a and 327b. The slot hole bracket 320 is U-shaped and mounted in an inverted manner, where surfaces 327a and 327b are upwards and the slots 321a, 321b, 323a and 323b are downwards. The manufacturing of the slot bracket 320 involves several machining operations such as drilling, milling, sawing, bending, etc. The slot hole bracket is also illustrated in FIG. 8 for a clarity.

The bean-shaped slots 321a and 321b are provided on the rear flange 329a and the front flange 329b respectively. These slots are identical and aligned along the horizontal axis. They positioned on the left side, with respect to the directions marked in the figure, of the component. The bean-shape provides for a curved motion path for an element residing in the slot. The slots are such that strictly horizontal and vertical motions are restricted.

The inclined slots 323a and 323b are provided on the rear flange 329a and front flange 329b respectively. These slots are also identical and aligned along the horizontal axis. These slots positioned on the right side, with respect to the directions marked in the figure, of the component. The inclined slots provide for an inclined motion path for an element residing in the slot. The slots restrict strictly horizontal and vertical motions.

The slot hole bracket 320 manufacturing is not limited to single sheet of metal. Alternately, it can be manufactured by joining separate plates. Further each plate can be manufactured separately with the necessary slots and holes. The plates containing the bean-shaped slots and inclined slots can then be joined perpendicularly to a third plate with holes. The joining can be done using one of the various joining methods such as welding, fasteners etc. Furthermore, additional holes may be created on the front flange 329b and the rear flange 329a to reduce the weight of the bracket or to support additional attachments to the bracket.

Figure 4:
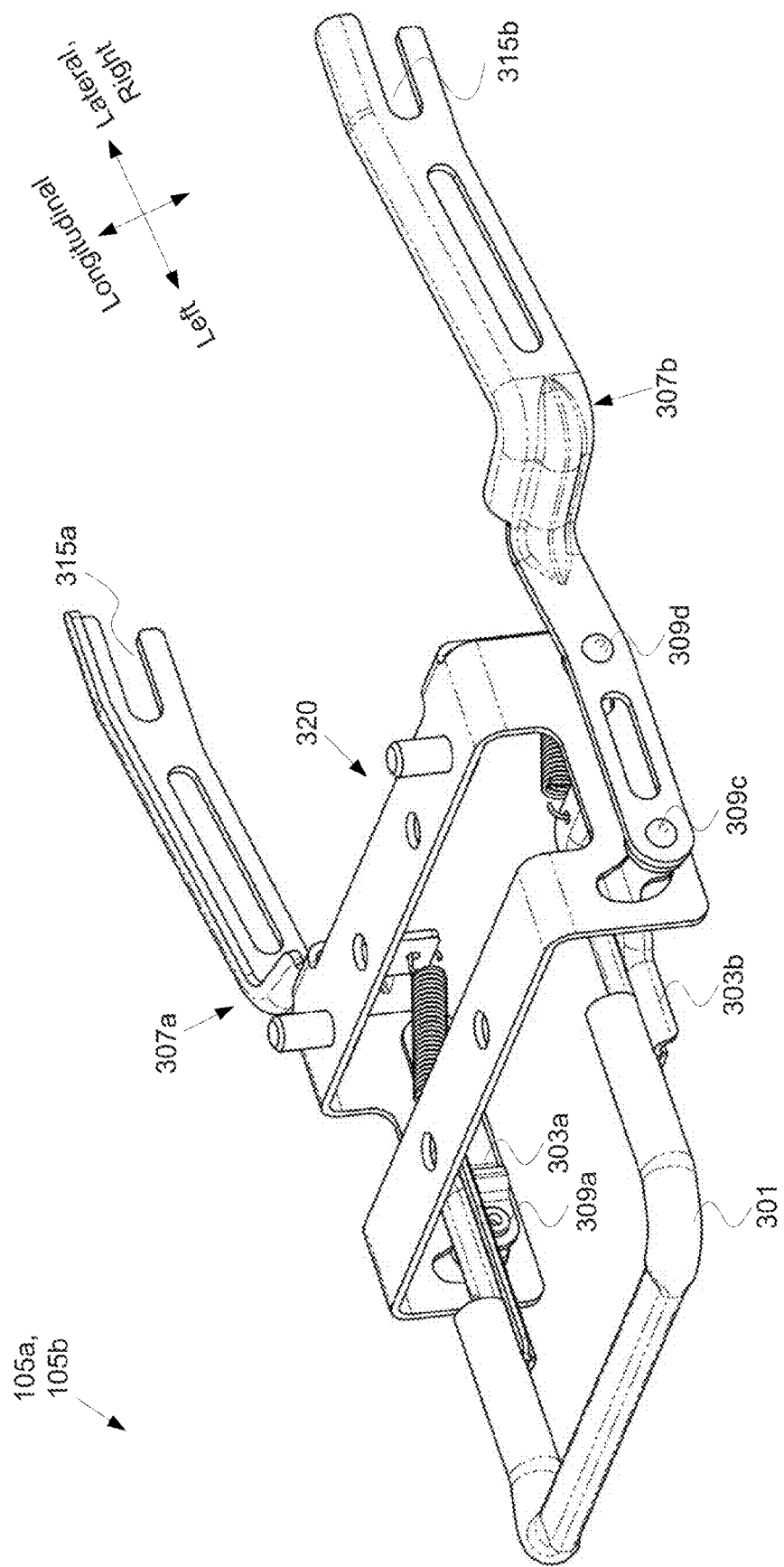
FIG. 4 is a perspective view of the operating handle assembly without the seat mounting bracket according to an aspect of present disclosure.
Figure 5:
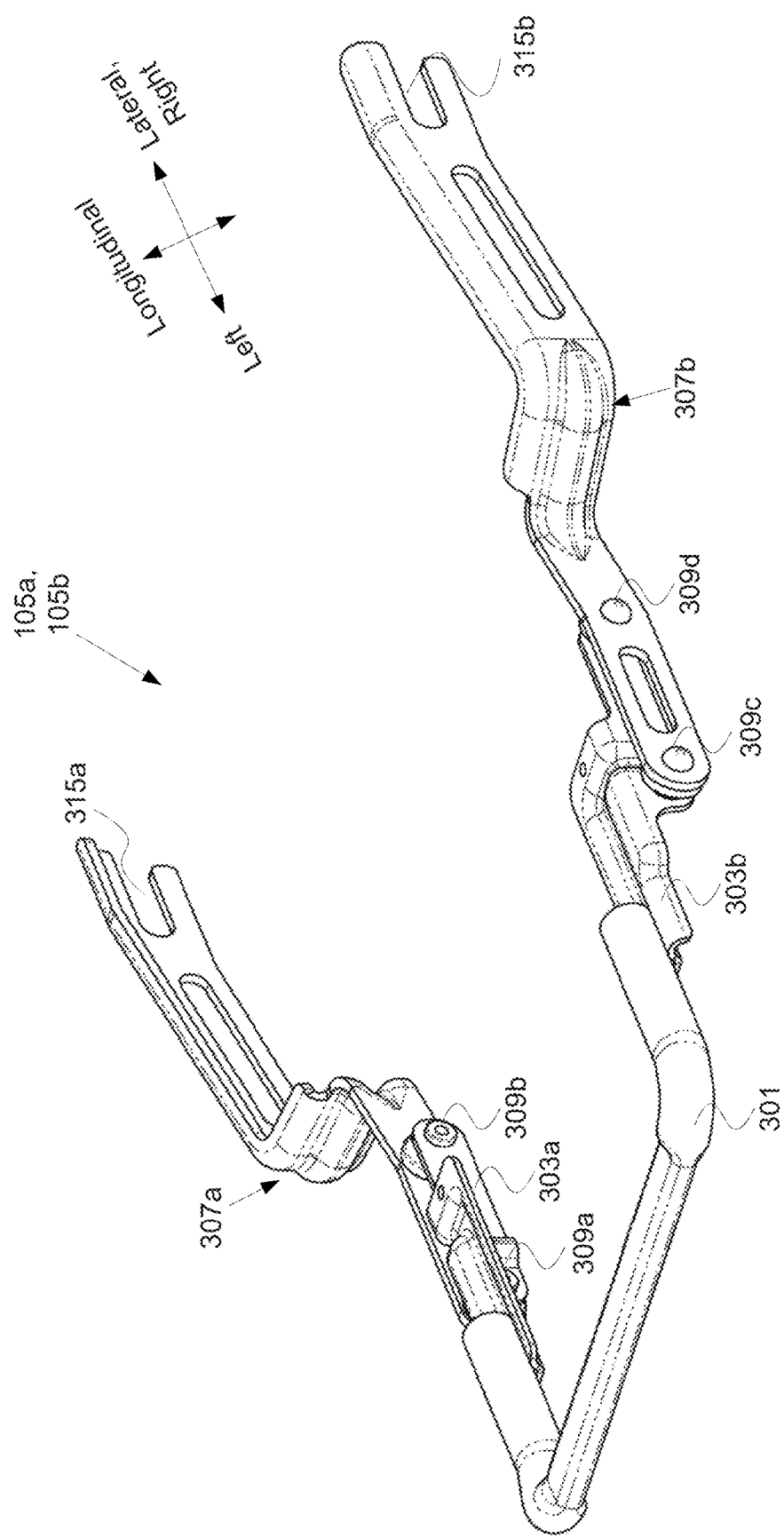
FIG. 5 is a perspective view of the operating handle assembly without a slot bracket of according to an aspect of present disclosure.

Referring to FIG. 4, the U-handle 301 and the connecting links 303a and 303b are connected to form a fixed joint, hence preventing relative movement between the U-handle 301 and the connecting links 303a and 303b. The U-handle 301 is connected to the slot hole bracket 320 and lock brackets 307a and 307b via rivets 309a, 309b, 309c (not visible in FIG. 4) and 309d. A rivet typically creates a pivot joint, which allows rotation between two connected components. However, the connecting link 303b fixed to the U-handle 301 is connected to the lock bracket 307b (307a) by two rivets 309c and 309d (309a and 309b) that are spaced apart along the lateral direction, thus preventing a relative rotation about horizontal axis between the U-handle 301 and lock bracket 307b (307a). Hence when a force is applied at the U-handle in upward or downward direction, the rivets experience a similar upward and downward force which is transmitted to the lock brackets 307a and 307b, thus the lock brackets 307a and 307b will move in upward or downward direction respectively. Thus the locking slot 315a and 315b will move in upward or downward direction, which will lock or unlock the locking mechanism (shown in FIG. 6). The assembly of U-handle 301, connecting links 303a and 303b, and lock brackets 307a and 307b is shown in FIG. 5. Note that in this variation the slot hole bracket 320 is not included, and using this assembly (shown in FIG. 5) without the slot hole bracket 320 to operate the lock mechanism may automatically unlock under high G-forces compared to the assembly using the slot hole bracket 320. The slot hole bracket 320 restricts the motion of the U-handle 301 such that under high G-forces the locking mechanism stays in locked position.

Referring back to FIG. 4, the lock brackets 307a and 307b, and the connecting links 303a and 303b, fixed to the U-handle 301, are connected to the slot hole bracket 320 via the rivets 309a, 309b, 309c and 309d. The slot hole bracket is connected between the connecting links 303a and 303b, and the lock bracket 307a and 307b. The rivets 309a and 309c rests in the bean-shaped slot hole 321a and 321b, while rivets 309b and 309d rests in the inclined slot 323a and 323b respectively. The rivets are free to move within the slots when a force is applied on the U-handle in an inclined and outward direction. The working of the operating handle assembly 105a under different conditions and forces is illustrated in FIGS. 9-13 and discussed in detail later in the embodiment of present disclosure.

The connecting links 303a and 303b, fixed to the U-handle 301, are further connected to the slot handle bracket 320 via springs 331 and 333, and the rivets 309a, 309b, 309c and 309d. The springs 331 and 333 create a tension type of link between U-handle 301 and the slot hole bracket 320. When a force extends the U-handle 301 in upwards direction, the springs 331 and 333 experience tension and when the force on U-handle 301 is released the springs retract to their original position while pulling the U-handle 301 downwards. The springs 331 and 333 also controls the amount of force to be applied to the U-handle 301 to move the seat. For a high tension spring the amount of force required at the U-handle 301 will be relatively higher, while for low tension spring the amount of force required will be relatively lower.

Figure 6:
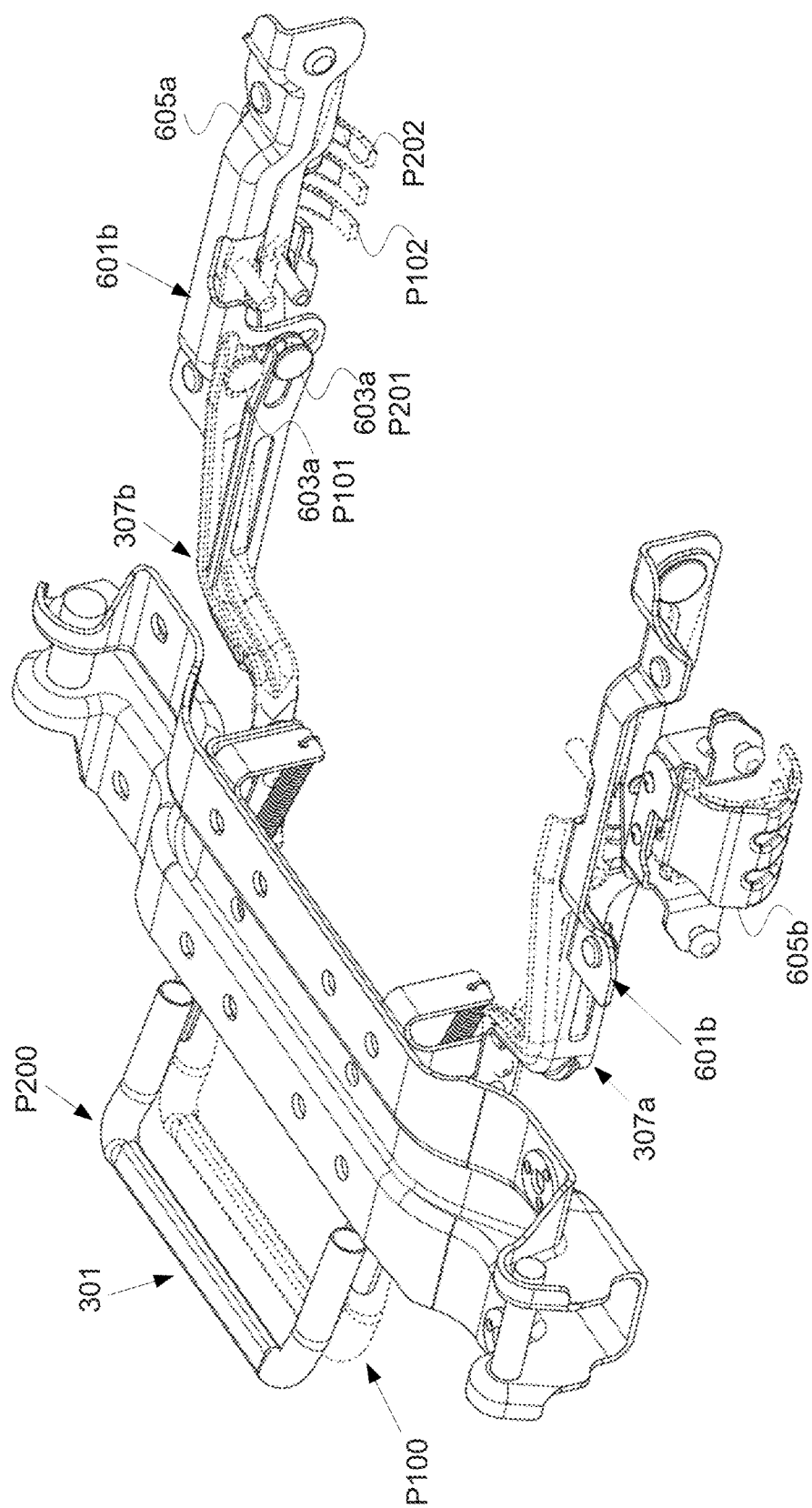
FIG. 6 is a perspective view of the operating handle assembly attached to a locking mechanism according to an aspect of present disclosure.

As discussed earlier, the slot hole bracket 307a and 307b are connected to the locking mechanism. FIG. 6 illustrates the assembly of the locking mechanism. The locking mechanism 601a (or 601b) is connected to the lock bracket 307a (or 307b) via a grooved pin 603a (or 603b). the grooved pin 603a (or 603b) slides along the lock slot 315a (or 315b) of the slot hole bracket 307a (or 307b) freely. The locking mechanism 601a (or 601b) also includes a fork grip 605a (or 605b) that is fixed with a pivot joint, as such can rotate about the corresponding pivot axis. The locking mechanism can be in a locked state (represented by dotted lines) or in an unlocked state (represented by solid lines). When the U-handle 301 is placed in a locked position P100, the grooved pin 603a (or 603b) is in position P101, the closed end of the lock slot, and the fork grip is in position P102. To unlock, a force is applied at the U-handle 301 which moves the lock bracket 307a and 307b downwards and as a result the grooved pins 603a and 603b move towards the open end of the lock slot. In unlocked state, the U-handle 301 is placed in an unlocked position P200, the grooved pin 603a (or 603b) is in position P201, the open end of the lock slot, and the fork grip is in a retracted position P202.

Alternatively, the slot hole bracket may include different types of slots to prevent unlocking of the seat. For example, right angled slots instead of bean-shaped or inclined slots may be employed. In this case, the seat unlocking will be a two steps process. First a horizontal force acting outwards is required which will move the rivets towards the left end in the slot, secondly a vertical force acting upwards (or downwards), depending on the position of the right angle, is required which will place the rivets in the top (or bottom) end of the slot. Furthermore, only two right angled slots may be provided instead of four slots—two bean-shaped and two inclined slots.

Figure 7A:
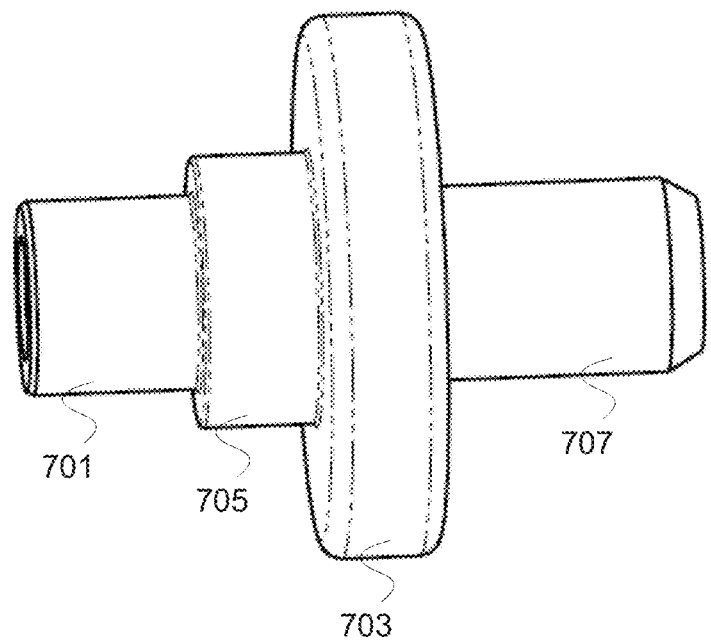
FIG. 7A is an elevation view of a rivet before a riveting operation is performed according to an aspect of present disclosure.

FIG. 7a illustrates a rivet used to in the operating handle assembly before the riveting action is performed. The rivet is stepped shaft where a first end 701 and a second end 707 have smallest diameter, a middle step 703 has the largest diameter, and the intermediate step 705 has a diameter larger than the first end 701 and second end 707 but smaller than the middle step 703. The intermediate step 705 supports the bean-shaped slot 321a and 321b and the inclined slot 323a and 323b of the slot hole bracket 320. The first end 701 goes in the holes of the connecting links 303a and 303b, while the second end goes in the holes of the lock bracket 307a and 307b. The middle step 703 creates a gap between the connecting links 303a and 303b and the slot bracket 320.

Figure 7B:
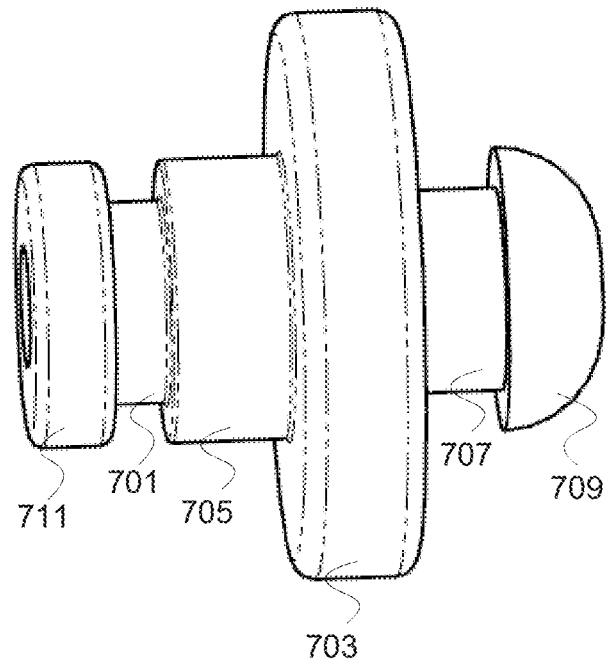
FIG. 7B is an elevation view of a rivet after a riveting operation is performed according to an aspect of present disclosure.

FIG. 7b illustrates form of the rivet after the riveting action is performed during the assembly process. The tip of the first part 701 is pressed to form a semi-circular head 709 and the tip of the second end 707 is pressed to form a semi-circular head 711. The diameter of the semi-circular heads 709 and 711 is larger than the holes in which the ends 701 and 711 reside, thus preventing accidental dismantle of the connected components.

Figure 9:
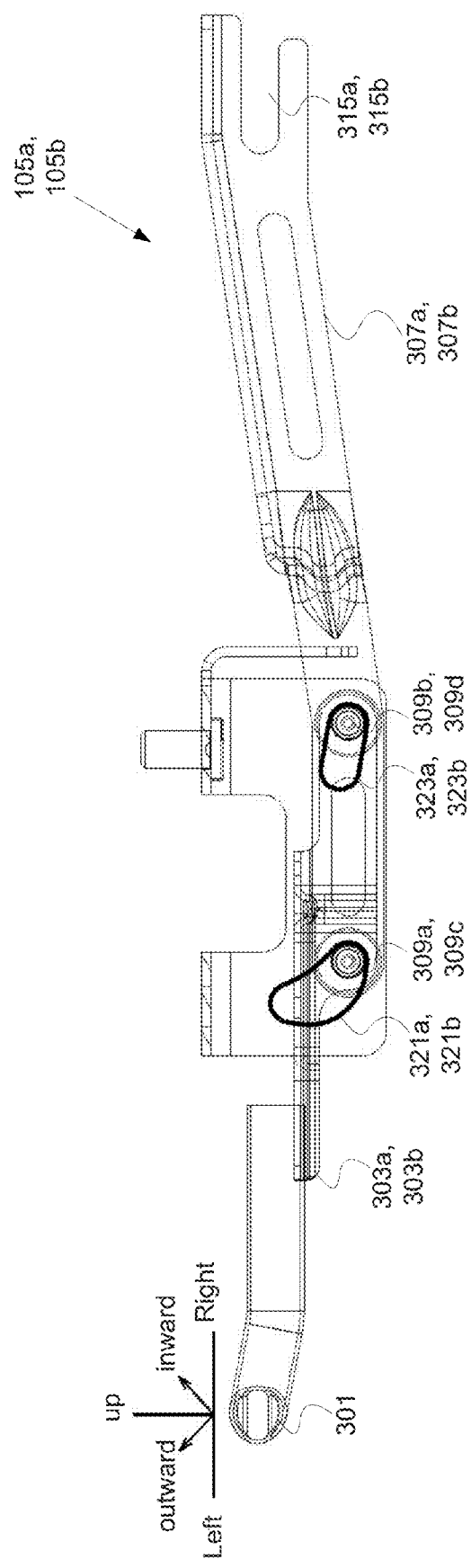
FIG. 9 is a side view of an operating handle assembly in a locked position according to an aspect of present disclosure.

FIGS. 9-13 illustrate the working of the operating handle assembly. FIG. 9 illustrates a side view of a configuration of the operating handle assembly when a seat (not shown) is in a locked state. The rivets 309b and 309d rest in the right end of the inclined slot 323a and 323b, while the rivets 309a and 309c rest in the bottom end of the bean-shaped slot 321a and 321b. The connecting links 303a and 303b are in horizontal position. In order to move the seat the seat lock must be released by applying a force on the operating handle assembly. A force (F) may be applied on the force bar of the U-handle 301 in different directions like upward, outward, inward, towards the right, towards the left and a combination thereof. The seat lock is released when the force is applied at an angle and directing outward on the U-handle 301 as shown. If the force on the U-handle 301 is inwards, vertically upwards or vertically downwards the seat is not released from the locked position.

Figure 10:
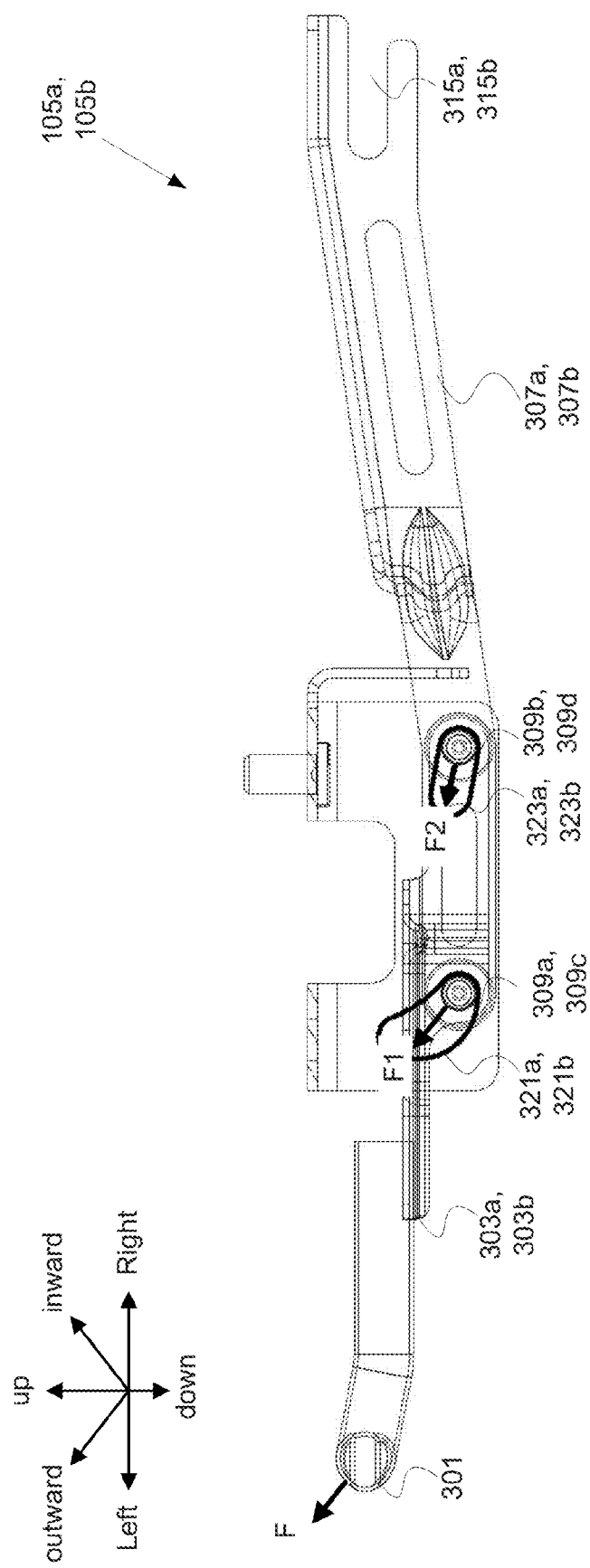
FIG. 10 is a side view of an operating handle assembly in a locked position when forces are applied according to an aspect of present disclosure.

FIG. 10 illustrates a component of the outward force acting on the rivets 309a, 309b, 309c and 309d. If a force (F) acting on the rivets can be divided into its inclined component such as force components F1 and F2 that act at an angle in an outward direction on the rivets, the inclined force components F1 and F2 will cause the U-handle 301 and lock bracket 307a and 307b assembly to move in the direction of the force F1 and F2. As a result the lock slot 315a and 315b will move downwards and release the seat lock (not shown in FIG. 10).

Figure 11:
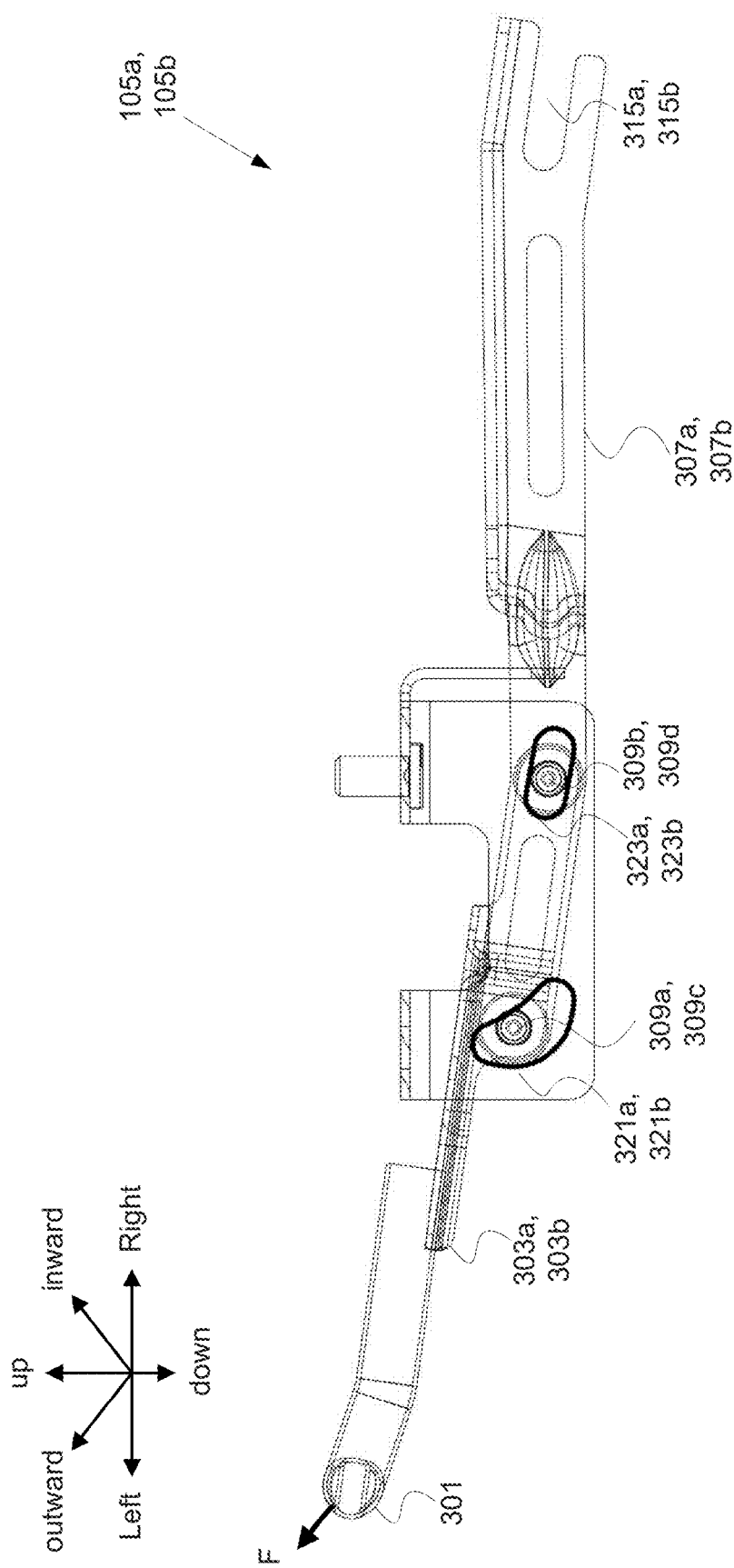
FIG. 11 is a side view of an operating handle assembly in an unlocked position according to aspect of present disclosure.

FIG. 11 illustrates operating handle assembly when a seat is in an unlocked state when a force F is applied to the U-handle. In an unlocked state, the rivets 309b and 309d rest in the left end of the inclined slot 323a and 323b, the rivets 309a and 309c rest in the top end of the bean-shaped slot 321a and 321b, and the connecting links 303a and 303b are inclined upwards. In order to stay in an unlocked state, the force F should not be removed.

Figure 12:
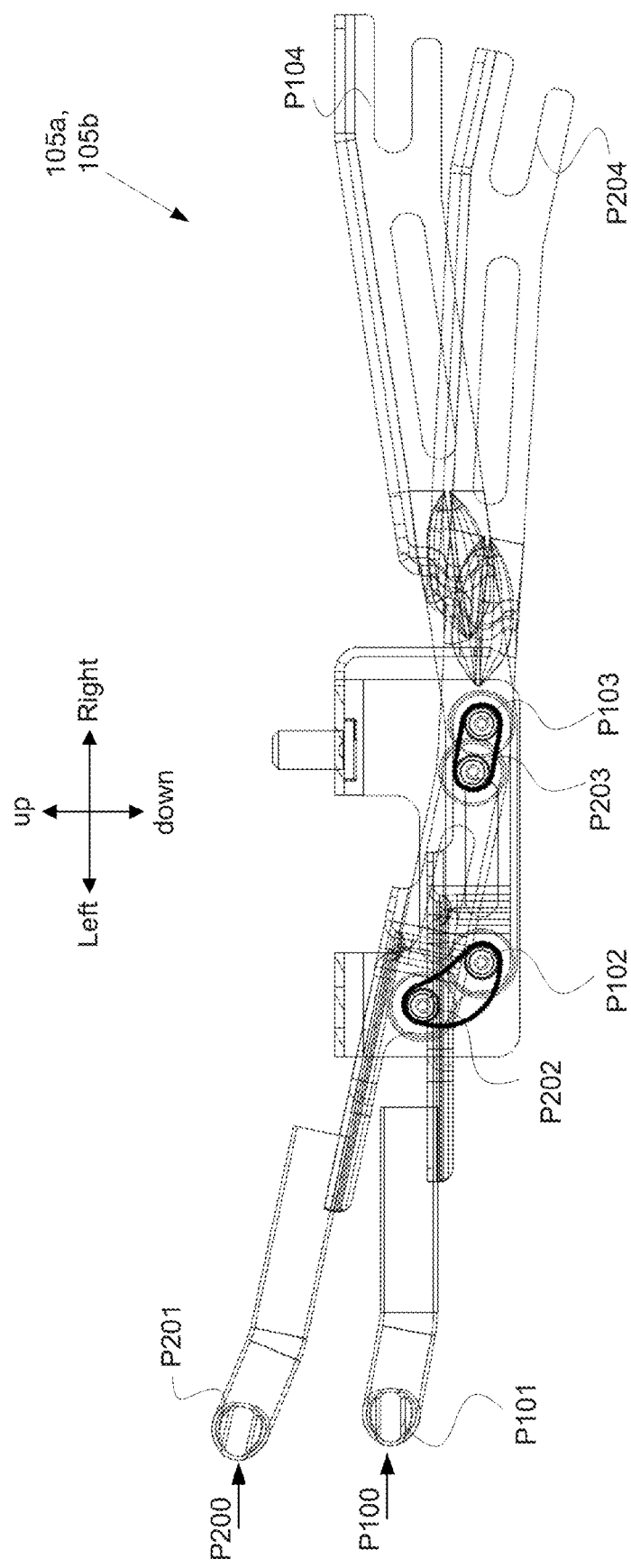
FIG. 12 is a side view of an operating handle assembly displaying the configuration in both locked and unlocked positions according to aspect of present disclosure.

FIG. 12 illustrates a side view of the operating handle assembly positions when a seat is in a locked state and an unlocked state respectively. In the locked position P100, the U-handle is in position P101, the rivets are in position P102 and 103, and the lock slot is in the position P104. In the unlocked position P200, the U-handle is in position P201, the rivets are in position P202 and 203, and the lock slot is in the position P204. In the locked position P100, the U-handle and the lock slot are approximately at the same level, however in the unlocked position P200, the U-handle is in an upward inclined position and the lock slot is in downward inclined position.

Alternatively, as mentioned earlier, depending on the locking mechanism the lock slot may display different relative positions. For example, to occupy an unlocked position the lock slot may move in a linear manner to the left in a horizontal direction instead of moving in an angular manner in downward direction.

Figure 13:
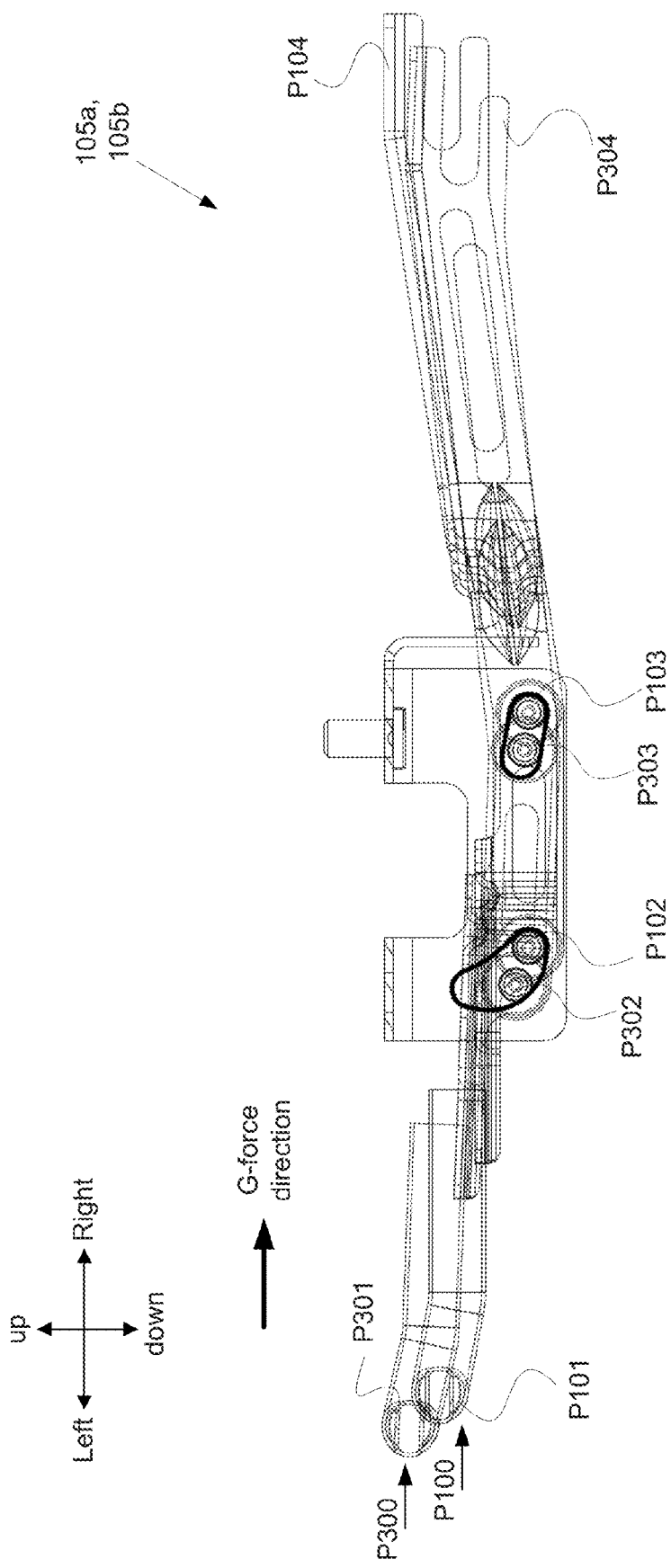
FIG. 13 is a side view of an operating handle assembly displaying the configuration in both locked and unlocked positions when a horizontal G-force is applied according to an aspect of present disclosure.

FIG. 13 illustrates operating handle assembly when a G-force load is applied in a horizontal direction towards the right. The term G-force is a measure of acceleration and creates a proportional force according to Newton's laws of motion, however G-force itself is not a force. In an example scenario of a vehicle with front impact, a G-force acts towards the right as shown in the FIG. 13. The G-force acting in the right direction causes the operating handle assembly to move in the left direction and the operating handle assembly occupies position P300. Notice that in position P300, the rivets in the inclined slots move from position 103 towards the left and occupy position P303, however the rivets in the bean-slots do not move to the top end, but occupy position P302 from position P102. Hence, the seat stays in the locked state even when high G-forces are applied. The operation handle assembly 105a (or 105b) in the embodiment of present disclosure is designed to withstand G-forces up to 80. Depending on the factor of safety considered in the design, the operating handle assembly can withstand a wide range of G-forces.

FIG. 14 illustrates a seat mounted on the operating handle assembly 105a. The seat 1401 is fitted with four hooks; two front hooks and two rear hooks (not shown). In FIG. 14 only one of the hooks is illustrated; remaining hooks are attached to seat mounting brackets in a similar manner. The front hook 1403 is latched on to the striker 203 of the seat mounting bracket 107a. The operating handle 301 is on the side of the seat 1401 to allow seat adjustment in the lateral direction.

Embodiments of present disclosure illustrate lateral direction seat movements; however the disclosure is not limited to the lateral direction, for example the apparatus may also be suitable for longitudinal direction seat movement.

Also, it should be understood that this technology when embodied is not limited to the above-described embodiments and that various modifications, variations and alternatives may be made of this technology so far as they are within the spirit and scope thereof.

What is claimed is:
1. A seat apparatus, comprising:
an operating handle;
a slot hole bracket including at least one inclined slot, the at least one inclined slot guides the operating handle in a horizontal direction and a vertical direction based on an inclined force on the operating handle; and
one or more lock brackets movably attached to the operating handle and the slot hole bracket,
wherein the operating handle is attached to one or more connecting links that connects to the slot bracket and the one or more connecting links have a groove conforming to one or more connecting bars of the operating handle.

2. The seat apparatus according to claim 1, wherein the operating handle is U-shaped.

3. The seat apparatus according to claim 1, wherein a lock bracket of the one or more lock brackets include one or more slots adjacent to a lock slot.

4. The seat apparatus according to claim 1, wherein the slot hole bracket has a top surface and two or more side flanges attached to the top surface.

5. The seat apparatus according to claim 4, wherein the top surface of the slot hole bracket includes holes to mount additional attachments.

6. The seat apparatus according to claim 4, wherein the top surface of the slot hole bracket includes a slot that runs entirely or partially along the length of the top surface.

7. The seat apparatus according to claim 4, wherein the two or more side flanges of the slot hole bracket include at least one profiled slot and at least one inclined slot.

8. The seat apparatus according to claim 4, wherein the at least one profiled slot of the slot hole bracket is bean-shaped.

9. The seat apparatus according to claim 1, wherein the plurality of fasteners have one or more steps that supports the at least one profiled slot and the at least one inclined slot of the slot hole bracket.

* * * * *